United States Patent [19]

Mackenzie

[11] 3,962,044

[45] June 8, 1976

[54] HEAT TREATING EXCRETA AND PRODUCTS THEREOF

[75] Inventor: John D. Mackenzie, Los Angeles, Calif.

[73] Assignee: The Regents of the University of California, Berkeley, Calif.

[22] Filed: June 17, 1974

[21] Appl. No.: 479,737

Related U.S. Application Data

[63] Continuation of Ser. No. 268,972, July 5, 1972, abandoned.

[52] U.S. Cl.................................. 201/2.5; 4/10; 4/131; 110/9 R
[51] Int. Cl.²................. C10B 43/00; A47K 11/02; E03D 1/00
[58] Field of Search ................ 201/2.5, 14, 15, 25, 201/27, 28; 4/10, 114, 131; 210/1, 2, 50, 71; 203/DIG. 5; 423/449

[56] References Cited
UNITED STATES PATENTS

| | | | |
|---|---|---|---|
| 1,189,638 | 7/1916 | Testrup et al..................... | 201/2.5 X |
| 2,246,224 | 6/1941 | Streander........................ | 159/1 RW |
| 3,272,740 | 9/1966 | Gitchel et al..................... | 210/50 X |
| 3,639,111 | 2/1972 | Brink et al....................... | 201/27 X |
| 3,671,403 | 6/1972 | Hess et al....................... | 201/2.5 |
| 3,761,568 | 9/1973 | Brink et al....................... | 201/27 X |
| 3,876,538 | 4/1975 | Hess et al....................... | 210/71 |

*Primary Examiner*—Jack Sofer
*Attorney, Agent, or Firm*—Nilsson, Robbins, Dalgarn & Berliner

[57] ABSTRACT

Solid animal excreta, such as solid livestock excreta, solid human excreta and solid poultry excreta, is converted to useful products by particulating the excreta and heat treating it in a closed heating zone at about 200°C to about 1000°C for a time sufficient to volatilize a portion thereof and provide the solid residue with a carbon content of about 1% to about 80 weight percent. The volatilized portion can be withdrawn from the heating zone and separately recovered by condensing the condensibles. This consists of an aqueous and a non-aqueous portion. The non-aqueous portion of the condensate is oleaginous in the form of an oil, grease or wax containing nitrogenous substances and is useful for a variety of purposes. The aqueous portion is rich in nitrogen and is useful as a fertilizer. The solid particulate residue can be employed as a foaming agent or filler for glass products and as a coloring agent or pigment in inks, paints and rubber products.

6 Claims, 1 Drawing Figure

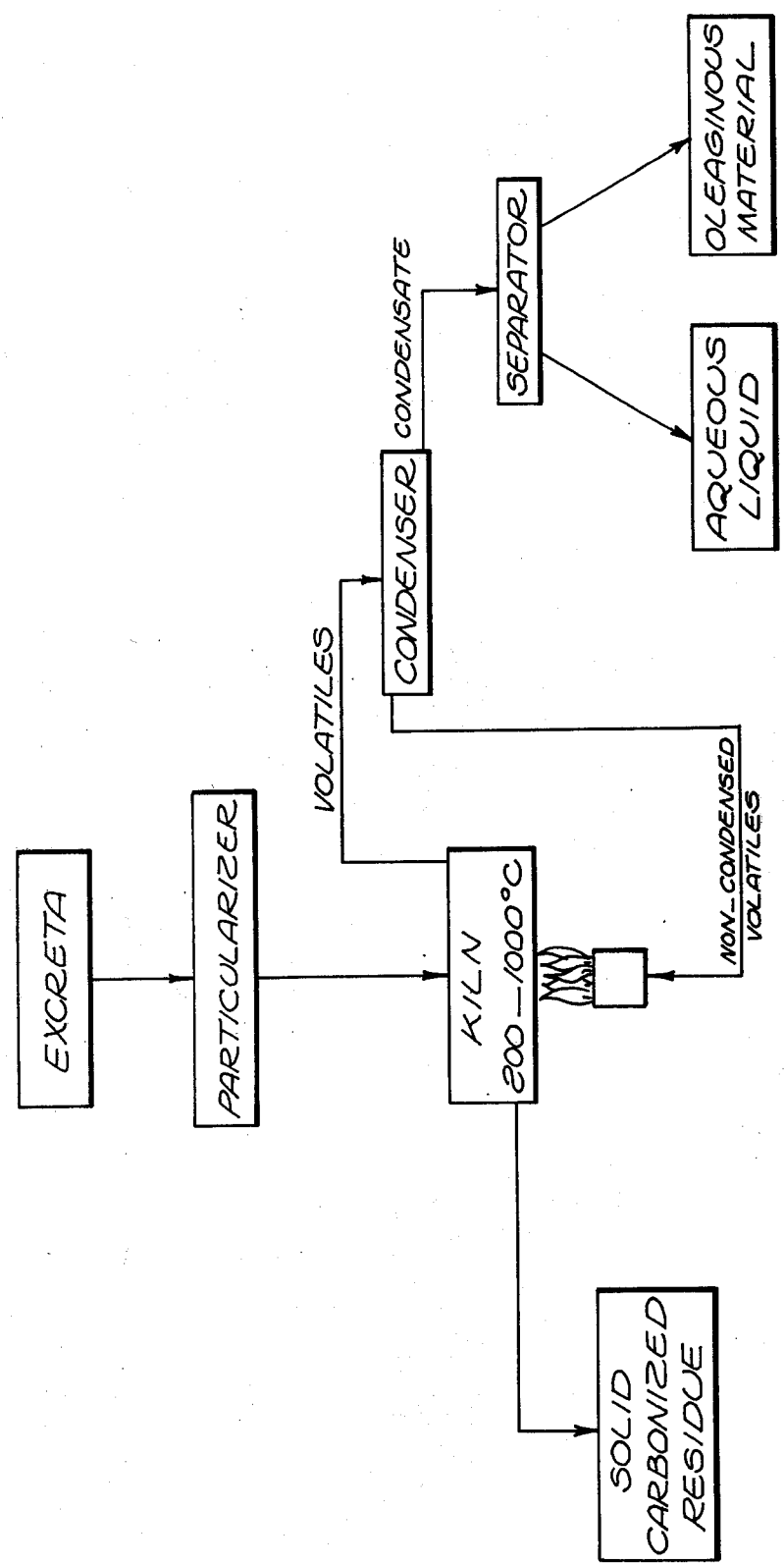

HEAT TREATING EXCRETA AND PRODUCTS THEREOF

This is a continuation, of application Ser. No. 268,972, filed July 5, 1972, now abandoned.

FIELD OF THE INVENTION

The present invention generally relates to treatment of waste materials and more particularly to the conversion of solid animal excreta into useful products.

BACKGROUND OF THE INVENTION

The disposal of solid animal excreta present a substantial and increasing ecological provlem. Vast quantities of solid human excreta are processed daily in city and county sewage treating plants by procedures which result in their precipitation and sterilization to form so-called sewage plant cakes. For example, the City of Los Angeles, California produces 150 tons of such cakes per day and Orange County, California 200 tons of such cakes per day. Moreover, the cakes normally are not employed as fertilizer but, instead, are left to pile up in drying areas until they are hauled away and dumped into disposal pits and the like.

Similarly, in California alone 1 million tons of solid cattle feedlot animal excreta is produced annually, most of which is merely piled up to dry and weather in the sun, forming undesirable, hard-to-handle mounds. Like quantities of solid sheep, hog and other feedlot livestock excreta and of solid poultry excreta also accumulate annually and present a serious disposal problem Various sanitary problems are involved with accumulation of animal excreta. As an example, it should be noted that it is a common practice to fatten certain livestock and poultry by adding massive dose of synthetic hormones such as diethyl stilbestrol to their diets. Animals so fattened are then held up to two weeks or so until their tissue content of such ingested hormones is reduced to below permissible levels. Such reduction in content of ingested hormones occurs in part by excretion. However, such hormones can be leached from the excreta by water and can pass therein into water supplies later used for drinking purposes. Water sterilization procedures such as chlorination have no appreciable effect on the viability of such hormones so that they may be imbibed with the drinking water, a very undesirable situation.

Accordingly, it would be desirable to provide an effective and economical method of utilizing much of the vast quantities of animal excreta accumulating daily. Preferably, such method should be adaptable for use with solid excreta such as human excreta, livestock excreta and poultry excreta, as well as other applicable solid excreta, and should eliminate sanitation problems such as those referred to above.

SUMMARY OF THE INVENTION

The present invention is substantially as set forth in the Abstract above. In this regard, a simple, effective method of treating solid animal excreta has been devised which results in total degradation of hormones therein and further results in the preparation of useful products in the form of solid black residue and oil, grease or wax. The solid black residue can be employed successfully as a foaming agent for glass, as a filler for glass products and as a coloring agent or pigment for products such as paints, rubber tires and the like products and inks. The oil, grease or wax is useful as a lubricant, nutrient and source material for the preparation of many useful chemical products and fertilizers. The aqueous portion contains dissolved nitrogenous materials and is useful as a fertilizer.

The present method can be carried out in an economical manner with recycling of a portion of the volatiles as fuel for the heating zone. Inexpensive equipment can be used and treating times and temperature are easily established and controlled within reasonable limits. Further features of the invention are set forth in the following detailed description.

DETAILED DESCRIPTION

In accordance with the present method, solid animal excreta is particulated to any desired average particle size range, for example, from about 5 to about 50 mesh. Such particulation can be carried out by crushing, rolling, or like conventional procedure.

The solid excreta can comprise any suitable solid animal excreta, whether from domesticated or non-domesticated species. Preferably, however, such excreta is that which presently forms a serious ecological problem and which lends certain advantageous properties to the products of the present method. Accordingly, the following solid animal excreta form a preferred class: solid livestock excreta, solid human excreta, solid poultry excreta and mixtures thereof. It is excreta of such class which is produced in vast quantities in and adjacent populated areas and which serves, at present, no useful purpose and is difficult to dispose of. It is also excreta of such class which exhibits sufficiently similar properties upon heat treatment to form useful oils, greases and waxes, as well as solid coloring agents, foaming agents and fillers of predictable characteristics. The most preferred species of solid animal excreta for present purposes are sewage plant cake, comprising sewage plant processed human excreta, and feedlot cattle excreta, and horse excreta at race courses.

The solid animal excreta, after particulating, is placed in a heating zone which may comprise a closed kiln, kettle, retort, vat, drum or the like and is subjected to heating therein. The heating zone normally is heated externally by heating means such as gas flames or the like. Heating temperatures are increased until a treating temperature for the excreta within the range of from about 200°C. to about 1000°C. is reached. The excreta is then held within that range until heat treating is completed. Usually, treating temperatures of about 300°C. to about 600°C. are preferred for the best and most economical results. Residence treating times of about 15 min. to about 120 min. usually are employed, although longer or shorter times can be used, depending on the treating temperatures employed. Such residence times and temperatures are sufficient to volatilize a portion of the excreta while the solid residue is partially carbonized to a carbon content of about 1 to about 80 weight percent of the residue. There is no need to reduce the residue to carbon char, since the partially carbonized residue is useful per se.

The solid particulate residue, also referred to herein as heat treated solid particulate animal excreta, is then cooled and recovered as a useful product. Usually, cooling is effected in a separate recovery zone, so that the heating zone does not have to be reheated to process further amounts of animal excreta. The present method can be carried out continuously or by batch or semi-batch techniques.

The volatilized portion of the excreta preferably is allowed to pass from the heating zone during heat treating. Alternatively, it can be left in the treating zone during heat treating but in any event preferably is at some point in time removed therefrom to a separate recovery zone. In the recovery zone it is usually processed by condensing the condensibles therein, for example, by passing the volatiles through a water cooled condensation column or tower or the like. The cooled condensate usually is then separated into aqueous and non-aqueous fractions, the non-aqueous fraction normally an oleaginous substance, by which is meant for present purposes an oil, grease or wax or mixture thereof. The non-condensed volatilized portion, i.e., the effluent from the cooling tower, contains combustible materials and, in one embodiment of the present method, is recycled to external flame heating means for use as fuel in heating the heat treating zone. This represents a substantial saving in the overall cost of operating the present method. Further details of the present invention are exemplified by the following specific Examples.

EXAMPLE I

In a first run, solid animal excreta comprising cow dung is particulated to an average mesh size of about 10 mesh and then passed into a closed heating zone and heated therein by the use of external flame heating to about 300°C. It is held at about that temperature for about 1 hr. while allowing volatiles to pass therefrom, after which time the solid black residue is transferred to a cooling zone and allowed to cool over about 15 min. to room temperature (70°F.) and analyzed. Chemical analysis shows the following approximate partial composition for such residue:

| Constituents | Weight Percent |
| --- | --- |
| Carbon | 31 |
| Silicon | 10 |
| Aluminum | 3 |
| Hydrogen | 2 |

X-ray diffraction analysis shows such residue to be crystalline.

In a second run, the procedure and conditions of the first run are followed, except that the treating temperature is about 1000°C. and the residence time about 10 min. Comparable results are obtained to those of the first run.

In a third run, the procedure and conditions of the first run are again followed, except to vary the treating temperature to about 700°C. and the residence time to about 20 min., while producing similar results.

Fourth and subsequent parallel runs carried out according to the foregoing procedure are summarized below:

| Run No. | Type of Excreta | Treating Temp. | Treating Time | Wt.% Carbon Content of Residue |
| --- | --- | --- | --- | --- |
| 4 | Sewage plant cake | 200°C | 1 hour | 40 |
| 3 | sewage plant cake | 1000°C | 10 min. | 25 |
| 6 | sewage plant cake | 800°C | 20 min. | 30 |
| 7 | solid chicken excreta | 200°C | 1 hour | 35 |
| 8 | solid chicken excreta | 1000°C | 10 min. | 15 |
| 9 | solid chicken excreta | 750°C | 15 min. | 20 |
| 10 | solid hog excreta | 250°C | 1 hour | 32 |
| 11 | solid hog excreta | 1000°C | 5 min. | 30 |
| 12 | solid hog excreta | 950°C | 10 min. | 38 |

Runs 4 through 12 summarized above indicate that a particulate residue of substantial carbon content can be obtained by the present method, the extent of carbonization depending on the starting material and treating conditions.

The black residues of Runs 1 through 12 are useful as coloring agents for inks, paints, rubber products and the like, as well as glass foaming agents and filler materials.

EXAMPLE II

Runs 13 through 24, identical to Runs 1 to 12, provide comparable residues. In addition, each instance the volatiles are recovered by passing them through a water-cooled condensation tower, the effluent being recycled to the flame heater firing the heating zone and the condensate being separated into aqueous and non-aqueous fractions. The characteristics of the non-aqueous fractions obtained in Runs 14 through 16 are set forth below.

| Run No. | Type | Weight - percent | | | Yield | Typical End Use |
| | | Carbon | Sulfur | Hydrogen | | |
| --- | --- | --- | --- | --- | --- | --- |
| 13 | oil | 69 | 1.1 | 8.5 | 12 | lubricant and fuel oil |
| 14 | oil | 66 | 0.4 | 10.2 | 11 | lubricant and fuel oil |
| 15 | oil | 65 | 0.5 | 9.7 | 13 | lubricant and fuel oil |
| 16 | oil | | No analysis | | 5 | lubricant and fuel oil |
| 17 | oil | | No analysis | | 7 | lubricant and fuel oil |
| 18 | oil | | No analysis | | 9 | lubricant and fuel oil |
| 19 | oil | | No analysis | | 15 | lubricant and fuel oil |
| 20 | oil | | No analysis | | 14 | lubricant and fuel oil |
| 21 | oil | | No analysis | | 14 | lubricant and fuel oil |
| 22 | wax | | No analysis | | 7 | wax |
| 23 | wax | | No analysis | | 9 | wax |
| 24 | wax | | No analysis | | 7 | wax |

The above-listed oil, grease and wax condensates have a number of useful properties. For example, they can be used as lubricants, heat energy sources, ingredients in polishing compounds and sources of chemicals, as well as liquid fertilizers. They also have other useful applications in various industries.

EXAMPLE III

An improvement in inks is provided by utilizing the residue as black pigment in a liquid vehicle. The ink comprises 50 weight percent of normal ink carrier as a vehicle, in which is suspended 50 weight percent of residue from the heat treament at 500°C for 20 min. in a closed heating zone of solid steer animal excreta having a particulate form of 10 average mesh size. The residue has a carbon content of about 40 weight percent and the following supplemental analysis: silicon — 3 weight percent; aluminum — 3 weight percent; hydrogen — 3 weight percent. The ink exhibits a lustrous black hue, although the black residue content thereof is relatively small. This is due to the high carbon content of the exterior portion of each residue particle and the irregular texture of the particle surface. Such ink is inexpensive and useful in printing and a variety of other applications. generally, residues used for this purpose should have a carbon content of about 20–80%. The amount of residue included in the ink can vary from about 10 to about 60 weight percent.

In run No. 26, an ink comprising normal liquid ink carrier as a vehicle with black pigmented residue in a concentration of about 35% is prepared, as in run No. 25, except that the residue is that obtained by heat treating hog excreta of average particle size of about 10 mesh for about 20 minutes at about 600°C in a closed retort heated by gas flame. Results comparable to those of the first run are obtained.

EXAMPLE IV

In run No. 27. a black pigment residue is prepared by particulating solid excreta comprising steer manure to an average particle size of about 100 mesh and then heat treating it at about 500°C for about 30 min. in a closed heating zone while removing volatiles therefrom. Such residue has a carbon content of about 45 weight percent and is largely in crystalline form. It is used as a coloring agent in a black rubber tire composition by adding it to unvulcanized polybutadiene rubber in a concentration of about 50 weight percent before conventional vulcanization. The black pigmented product is satisfactory in all respects as to color and overall appearance. Generally, residues used for this purpose should have a carbon content of about 20–60%. The amount of residue included in the rubber can vary from about 10–75 weight percent.

In run No. 28, the procedure of run No. 27 is followed, except that polyurethane elastomer is used, and the residue is present therein in a concentration of about 40 weight percent. Moreover, such residue is that which has been prepared by heat treating hog excreta of 100 mesh average particle size for about one hour at about 450°C in a closed retort while removing volatiles.

EXAMPLE V

In run No. 29, the procedure of run No. 2 is followed, the resulting residue being added in a concentration of about 10 weight percent to a white paint having the following general formulation:

| Constituents | Wt.-% |
|---|---|
| Vehicle | 80 |
| Filler | 10 |
| Extender | 10 |

The resulting paint is gray, the pigmented residue being effective as a tinting agent for the paint.

In run No. 30, the procedure of run No. 3 is followed, the resulting residue being added in a concentration of about 20 weight percent to a color painting formulation have the following ingredients:

| Constituents | Wt.-% |
|---|---|
| Vehicle | 75 |
| Filler | 20 |
| Extender | 5 |

The resulting finished paint is lustrous black in color, the residue being successfully employed as the sole pigment therein.

Accordingly, the method of the present invention is simple, inexpensive and effective in converting solid animal excreta into useful end products capable of being utilized for a variety of applications. Each such application increases the desirability of the method and furthers its effectiveness as a useful procedure for solving the current ecological problem connected with disposal of solid waste substances.

Various modifications, changes, alterations and additions can be made in the present method, its steps and parameters. All such modifications, changes, alterations and additions as are within the scope of the appended claims form part of the present invention.

I claim:

1. A method of treating solid dry animal excreta selected from the group consisting of solid livestock excreta, solid poultry excreta, solid human excreta in cake form, and mixtures thereof, to provide useful products therefrom, which method consists essentially of:
    particulating said solid dry animal excreta to a mesh of about 5–50;
    heating said dry particulate excreta in a closed heating zone by heating means to a temperature within a treating range of about 300°C to about 600°C;
    maintaining said dry particulate excreta in said heating zone within said range for about 15 minutes to about 120 minutes sufficient to volatilize a portion of said excreta and partially carbonize the resultant solid residue;
    separating and recovering said volatilized portion by condensation of condensibles and separation of water therefrom; and
    cooling said residue and recovering the same.

2. The method of claim 1 wherein the carbon content of said residue is about 1 to about 80 weight percent.

3. The method of claim 1 wherein said separated volatilized portion of said excreta is removed from said heating zone and is transported to and recovered in a recovery zone.

4. The method of claim 1 wherein said volatilized portion is recycled to said heating means as fuel and wherein said heating means comprises external flame heating means.

5. The method of claim 1 wherein said excreta comprises cattle excreta.

6. The method of claim 1 wherein said excreta comprises sewage plant cake.

* * * * *

UNITED STATES PATENT AND TRADEMARK OFFICE
CERTIFICATE OF CORRECTION

PATENT NO. : 3,962,044
DATED : June 8, 1976
INVENTOR(S) : John D. Mackenzie

It is certified that error appears in the above-identified patent and that said Letters Patent are hereby corrected as shown below:

Column 4, line 8, change "3" to --5--.

Signed and Sealed this

Fourteenth Day of December 1976

[SEAL]

Attest:

RUTH C. MASON
*Attesting Officer*

C. MARSHALL DANN
*Commissioner of Patents and Trademarks*